United States Patent
Heaton et al.

(10) Patent No.: US 6,956,683 B2
(45) Date of Patent: Oct. 18, 2005

(54) PIVOTING PLATFORM HAVING A PIEZOELECTRIC DRIVE

(75) Inventors: Mark W. Heaton, Irving, TX (US); Arthur M. Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/458,947

(22) Filed: Jun. 11, 2003

(65) Prior Publication Data

US 2004/0252356 A1 Dec. 16, 2004

(51) Int. Cl.[7] .............................................. G02B 26/08
(52) U.S. Cl. ...................... 359/198; 359/199; 359/224; 359/900
(58) Field of Search ................................ 359/196–226, 359/900; 347/243, 259–260; 310/311

(56) References Cited

U.S. PATENT DOCUMENTS 5,245,464 A * 9/1993 Jensen ......................... 359/224
5,629,790 A    5/1997 Neukermans
6,295,154 B1   9/2001 Laor et al.
6,379,510 B1   4/2002 Kane et al.

OTHER PUBLICATIONS

Piezo Systems, Inc., Introduction to Piezo Tranducers, Piezo Systems—Piezo Actuators & Transducers, pp. 1–8, Internet, Cambridge, Massachusetts, USA, no date.

* cited by examiner

*Primary Examiner*—James Phan
(74) *Attorney, Agent, or Firm*—William B. Kempler; W. James Brady, III; Frederick J. Telecky, Jr.

(57) ABSTRACT

A pivoted platform has two flexible arms having rigid end zones which are attached by means of spacers to piezoelectric elements. The piezoelectric elements are made to deflect in opposite directions upon the application of the electrical signal to cause the platform to pivot. Applying voltages of the opposite polarity causes the platform to pivot in the opposite direction. A mirror may be attached to the platform to produce a scanning mirror for the vertical deflection of a television image.

7 Claims, 2 Drawing Sheets

PIVOTING PLATFORM HAVING A PIEZOELECTRIC DRIVE

REFERENCE TO RELATED APPLICATIONS

This application is related to U.S. patent application Ser. No. 10/458,995 entitled "Position Sensor For A Pivoting Platform", commonly assigned and filed on even date herewith, which is incorporated herein by reference.

FIELD OF THE INVENTION

This application relates to a pivoting platform and more particularly to a pivoting platform for a scanning micromirror device.

BACKGROUND OF THE INVENTION

Micromirror devices for use, for example, in optical communications techniques and for optical matrix switches are known in the art. For example, apparatus useful for such communications links is known from U.S. Pat. No. 6,295,154, entitled "Optical Switching Apparatus", commonly assigned herewith and incorporated herein by reference. This patent discloses a micromirror assembly for directing a light beam in an optical switching apparatus. As disclosed in this patent, which reflects the light beam in a manner that may be precisely controlled by electrical signals, the micromirror assembly includes a silicon mirror capable of rotating in two axes. One or more small magnets are attached to the micromirror itself; a set of four coil drivers are arranged in quadrants, and are controlled to attract or repel the micromirror magnets as desired, to tilt the micromirror in the desired direction.

Micromachined mirrors for two-dimensional scanning at different rates suitable for television display are known, for example, in U.S. Pat. No. 5,629,790. The mirrors may be electrostatically or electromagnetically deflected and rely on the torsional forces in the flexible hinges to restore the mirror to its original position in a resonance scanning technique. The magnetic deflection technique uses a galvanometer type drive in which the coil is formed around the periphery of the mirror and a permanent magnet is provided external to the mirror. The mirrors operate at resonant frequency as shown in the Table 1 in the patent, and can be utilized along with modulated laser light to form television receiver images as a compact substitute for a cathode ray tube.

It is desirable to have a very small mirror, on the order of 1 $mm^2$, which could be built into a compact package and used for scanning at a vertical scanning frequency of 50 or 60 Hz, for example. This mirror would not utilize a resonance scanning frequency. If a magnetic drive were utilized which requires the mounting of a permanent magnet on the mirror, the mass of the permanent magnet would be larger than the mass of the mirror, which would place undue stresses on the mirror and make for an inefficient operation. Thus, there is a need for a mirror which utilizes a different drive system.

SUMMARY OF THE INVENTION

It is a general object of the present invention to provide a pivoting platform having a piezoelectric drive.

This and other objects and features are provided, in accordance with one aspect of the invention, by a pivoting platform comprising a support. A first piezoelectric element is attached to the support at a first position and projects therefrom in a first direction, the first piezoelectric element bending in a second direction in response to an electrical signal applied thereto. A second piezoelectric element is attached to the support at a second position, the second position being offset from the first position in the second direction, whereby the first and second piezoelectric element are lined up, one below the other, in the second direction, the second piezoelectric element bending in a direction opposite the first piezoelectric element in response to an electrical signal applied thereto. A platform having first and second flexible arms is attached thereto. First and second spacers wherein the first spacer connected between the first piezoelectric element and the first flexible arm and the second spacer connected between the second piezoelectric element and the second flexible arm.

Another aspect of the invention includes a method for pivoting a platform having first and second flexible arms coupled to first and second piezoelectric elements. The first piezoelectric element is energized to bend in a first direction. The second piezoelectric element is energized to bend in a direction opposite the first piezoelectric element.

A further aspect of the invention is provided by a scanning mirror comprising a mirror assembly having a pair of flexible arms attached thereto. A first piezoelectric element is coupled to one of the flexible arms at an end thereof and connected to a support at another end thereof. A second piezoelectric element is coupled to another of the flexible arms at an end thereof and connected to the support at another end thereof.

Yet another aspect of the invention comprises a method of scanning an image utilizing a scanning mirror comprising a first and a second piezoelectric element coupled to the mirror by flexible arms. A light beam modulated by image data is directed onto the mirror. The first piezoelectric element is actuated to bend alternately in a first direction and then a second direction, the second direction being opposite the first direction. The second piezoelectric element is actuated to bend alternately in a second direction and then a first direction, whereby the mirror is caused to scan one axis of the image.

DETAILED DESCRIPTION OF THE PRESENT INVENTION

Figure 1A:
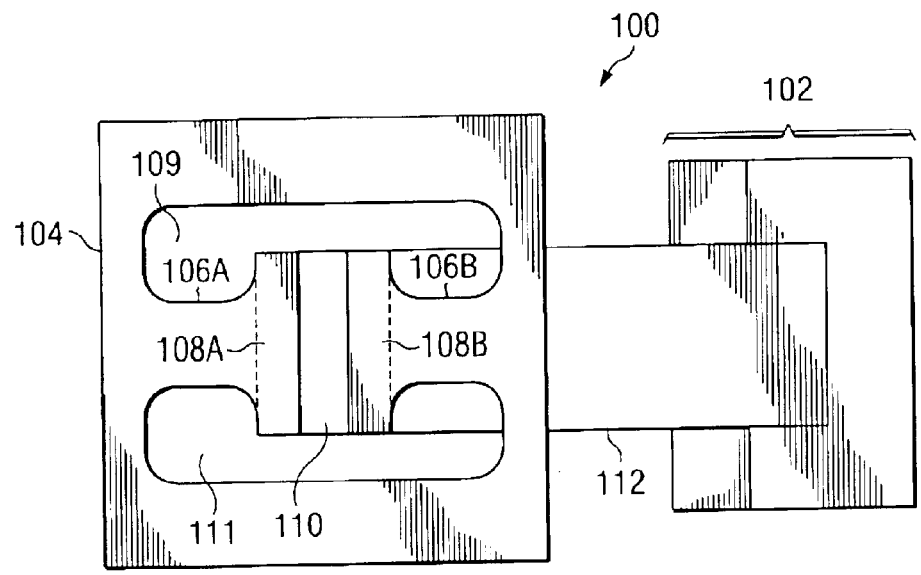
FIG. 1A is a plan view of a pivoting platform according to the present invention.
Figure 1B:
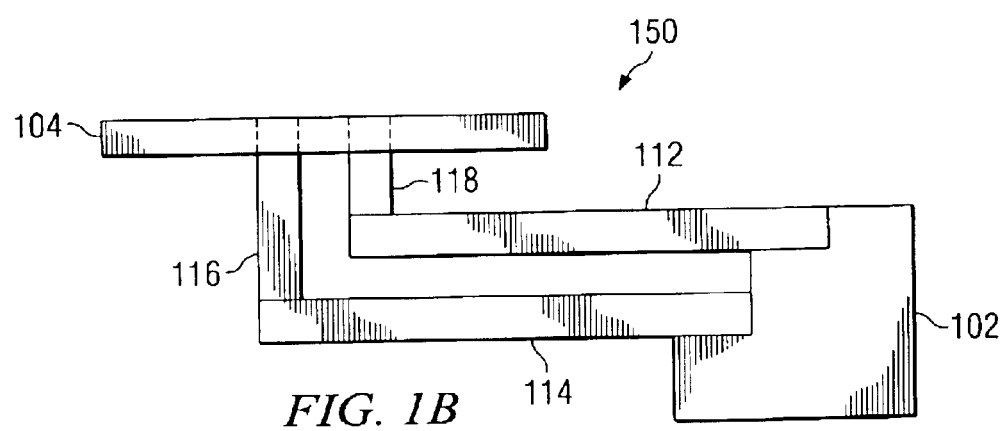
FIG. 1B is a side view thereof while the platform is at the rest position.

Referring to FIG. 1A, a plan view of the present invention is shown generally as 100. A support 102 has attached thereto two piezoelectric elements 112 and 114 (element 114 is not shown in FIG. 1A) in which the element 112 is above element 114. Referring to FIG. 1B, a side view of FIG. 1A is shown generally as 150. In the side view, it can be seen that element 112 and element 114 are physically located one above the other and are attached to the support at stepped portions of the support. Each of the elements 112, 114 can be the same length, but this is not required. The piezoelectric elements 112, 114 are made from a piezoelectric material known in art, which is a two-layer element that produces a curvature when one layer expands while the other layer contracts. These devices, sometimes referred to as "benders", produce this curvature when an appropriate electric voltage is applied thereto. Piezoceramic elements possessing these properties are available through Piezo Systems Incorporated, for example. The type of piezoelectric device that is chosen for elements 112, 114 is a design choice and not critical to the present invention.

Platform 104 is attached to the two piezoelectric elements 112, 114 via spacers 116, 118, respectively, in order to align the motion point associated with the piezoelectric elements. These spacers are attached to two arms 106A and 106B, best shown in FIG. 1A, of the platform 104. The arms are designed to flex in response to motion from the piezoelectric elements 112, 114, respectively. As shown in FIG. 1A, there is a space surrounding each of the arms which are thinner in width at the flexing area and the width of the spacers at the attachments points 108A and 108B, respectively. It is desirable that the attachment points 108A and 108B are relatively rigid with respect to the arms 106A and 106B and they are made more rigid by being attached to the rigid spacers 116, 118. Reference numeral 110 shown in FIG. 1A is not an element of the platform 104 and the sections 108A and 108B are not, in fact, attached. In looking down on platform 104, one sees the piezoelectric element 114, which happens to be the same width as the elements 108A and 108B, thereby giving the impression in the drawings that these are connected, when in fact they are not. If the element 104 was viewed by itself, the element 110 would be part of the space 109 and 111 surrounding the elements 106A and 106B.

The platform 104 is preferably formed from a silicon wafer, such as the silicon wafers typically utilized in forming integrated circuits. The wafer may have a thickness of 120 microns, for example. Each platform 104 would be formed by micromachining the silicon utilizing etching processes to etch out the space 109, 111 around the arms 106A and 106B and the attachment point 108A and 108B, respectively. As stated above, the area 110 would be a space at this point. Forming the arms 106A and 106B with the attachment point 108A and 108B is done by etching through the silicon to produce arms that are independent of one another. The flexibility of the arms is determined by the length and width of the arms. It is also possible to thin the sections 106A and 106B to increase their flexibility, but this is not required to practice the present invention. The techniques for this micromachining on silicon are well known and need not be detailed here. Once the elements 104 have been formed on the wafer, the elements are diced from the wafer into individual devices. Material other than silicon can be utilized to form the platform 104, but silicon is the preferred material because it can be readily micromachined to form the structure shown in FIG. 1A such that preselected portions of the platform are stiff whereas others are flexible.

Spacers 116 and 118 have no electrical properties in the present invention and can be made from any relatively stiff material such as aluminum or ceramic. It is desired that these materials be stiff enough as to not bend when force is applied by piezoelectric elements 112 and 114 as discussed below. The spacers 116 and 118 are to transmit this force to the arms 106A and 106B at the attachment points 108A and 108B, respectively. The spacers may be attached to the piezoelectric elements 112, 114 and the platform 104 at attachment points 108A and 108B utilizing a suitable epoxy, for example. Other suitable attachment methods may also be used.

Figure 2A:
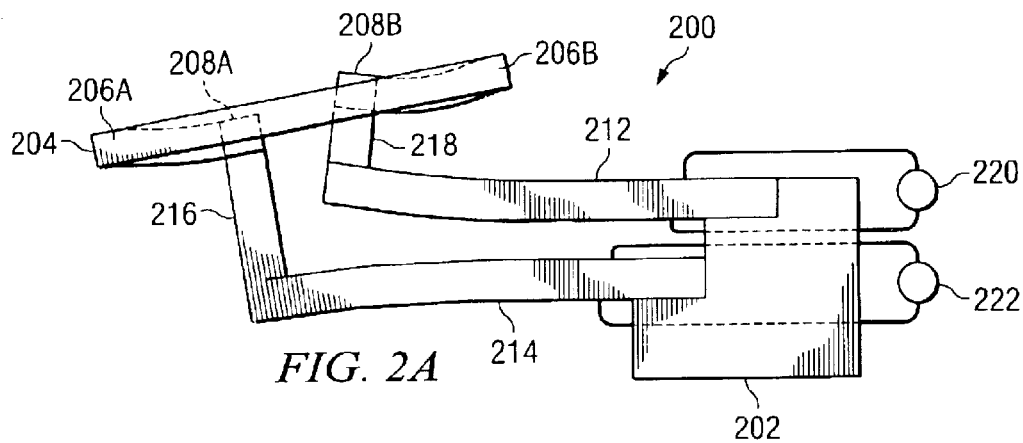
FIG. 2A is the side view of FIG. 1B wherein the platform is turned counterclockwise.
Figure 2B:
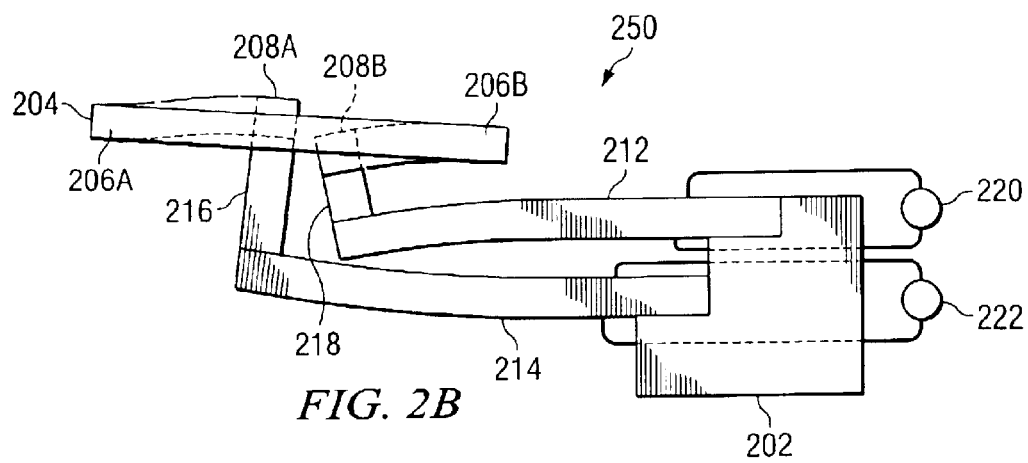
FIG. 2B is the side view of FIG. 1B with the platform is turned clockwise.

FIG. 1B shows the device 150 in its neutral position. FIGS. 2A and 2B show the platform 104 turned clockwise and counterclockwise, respectively. The elements in FIGS. 2A and 2B have similar reference numerals to the corresponding elements in FIGS. 1A and 1B. The movement of the platform is such that it appears that the platform is pivoting about an imaginary axis (not shown) to produce a partial rotation about the imaginary axis.

FIG. 2A shows the platform 204 pivoting in the counterclockwise direction. In order for this to occur, an electrical signal is applied to the piezoelectric elements 212, 214, respectively. In FIG. 2A, two voltage signal sources 220 and 222 are shown connected to the piezoelectric elements 212 and 214, respectively. The voltage and polarity of the electrical signal depends on a particular piezoelectric material chosen for the elements 212 and 214 and the way they are mounted. As shown in FIG. 2A, the elements 212 and 214 are wired such that element 212 bends in the clockwise direction, up in the figure, and element 214 bends in a counterclockwise direction, down in the figure. This can be accomplished in several ways. One is to mount element 214 opposite that of element 212. The other is to wire the devices such that the polarity applied to element 212 is opposite that of applied to element 214, and a third possibility is applying signals of opposite polarity to each of the devices. In FIG. 2A, a single source 220 or 222 could be wired to both piezoelectric elements 212, 214. If the two piezoelectric elements are mounted to bend in opposite directions with the same voltage applied, then they will both be wired identically. If they are mounted to bend in the same direction with the same voltage applied, they will be wired oppositely. Alternately, they could each be wired to a separate supply or signal source 220 or 222 as illustrated in FIG. 2A. As shown in FIG. 2A, the force applied by piezoelectric element 212 is conveyed by spacer 218 to the attachment point 208B of flexible arm 206B. This causes the arm to bend upward at the end 208B forming a more or less concave curve at the top of the arm 206B. Conversely, element 214 pulls connection point 208A down via spacer 216 to cause the arm 206A to bend downward. It should be noted that the arm and attachment 206A, 208A bend below the surface of the platform 204 whereas a portion of the arm 206B and/or attachment point 208B bends above the surface of the platform 204, as shown in FIG. 2A. The forces are applied to the flexible arms to provide the flexibility needed to turn the upward and downward curved motion of the elements 212, 214, respectively, into a pivoting of platform 204 without the need for pivotable joints where the spacers 216, 218 are attached to the platform. This allows the device to be simple in construction and compact, as well as mechanically less complex.

FIG. 2B shows a side view of the device shown in FIG. 2A generally as 250. The construction is the same as found in FIG. 2A and 1B but the platform 204 is pivoted in the clockwise direction. In this case, the voltage applied to these electric elements 212 and 214 is reversed, utilizing circuitry well know in the art, to cause the elements to bend in the opposite direction from that shown in FIG. 2A. Accordingly, element 212 bends in the downward direction and element 214 bends in the upward direction. Element 212 pulls attachment point 208B down via spacer 218 causing flexible arm 206B to bend downwardly forming a more or less concave curve at the bottom of the arm. Conversely, piezoelectric element 214 bends upwardly pushing point 208 up via spacer 216 to cause arm 206A to deflect upwardly as shown in FIG. 2B. This causes the mirror to pivot in the opposite direction from FIG. 2A and causes arm 206A and attachment point 208A to protrude from the top of the platform 204 and the attachment point 208B and a portion of the arm 206B to protrude from the bottom of the platform 204.

Figure 3:
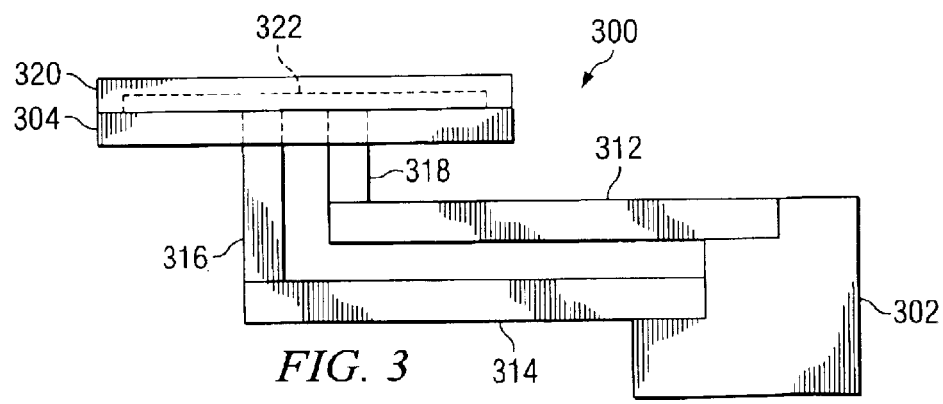
FIG. 3 is the side view of FIG. 1B showing a mirror mounted on the platform.

FIG. 3 shows the present invention having a mirror attached to the platform generally as 300. If the pivoting platform is to be utilized to pivot a mirror for scanning a light beam to produce a television image, for example, a mirror surface must be attached to the platform shown in FIGS. 1A, 1B, 2A, 2B. The numerals used in FIG. 3 are similar to the reference numerals for corresponding parts in FIGS. 1 and 2. The mirror 320 is attached to the platform 304. The mirror may be formed from the same type of silicon wafer utilized to form platform 304 by polishing the mirror surface and by applying a metallic film or a reflecting film thereto, if desired. In order to accommodate the movement of the spacers, the flexible arms and the attachments points above the surface of platform 304, a cavity 322 must be formed on the underside of the mirror. If the mirror is made from silicon, this can be done by well known micromachining techniques, such as etching the silicon in order to form this cavity. The size and shape of the cavity would match the space needed to accommodate the movement of these components above the platform 304 when the mirror is pivoted from the neutral position shown in FIG. 3. The mirror 320 could be formed from materials other than silicon, but the micromachine of silicon is well known and established and the mirror could be formed in conjunction with the formation of the platform. The mirror may be a square having a dimension of 1 mm on each side, for example. Item 320 can be made of two pieces. One piece is a spacer/frame that provides the cavity and the other a flat mirror.

The shape of the platform 304 is not limited to that illustrated. Other shapes may provide a central portion which could be polished to form a mirror, and a metallic film could be applied thereto, if desired. This would eliminate the need for a separate mirror and for etching a cavity therein.

The operation of the device shown in FIG. 3 to pivot the mirror in the clockwise or counterclockwise direction is identical to that shown in FIGS. 2A and 2B with the movement of the spacers, attachment points and flexible arms above the surface of the platform being accommodated by the cavity 322.

The piezoelectric elements 312, 314 can be ultimately energized to deflect as shown in FIG. 2A and then to deflect as shown in FIG. 2B to produce a scanning motion. The scanning motion may move the mirror at a frequency of 50 or 60 Hz, for example, for the vertical deflection of a television picture. The scanning mirror thus produced is simple in construction, compact in size and very energy efficient.

While the invention has been shown and described with reference to preferred embodiments thereof, it is well understood by those skilled in the art that various changes and modifications can be made in the invention without departing from the spirit and scope of the invention as defined by the appended claims.

What is claimed is:

1. A scanning mirror comprising:

a mirror assembly comprising a mirror element attached to a platform and having a pair of flexible arms attached thereto, wherein the platform and the flexible arms are formed as a unitary structure from a silicon wafer;

a first piezoelectric element coupled to one of the flexible arms at an end thereof and connected to a support at another end thereof;

a second piezoelectric element coupled to another of the flexible arms at an end thereof and connected to the support at another end thereof.

2. The scanning mirror of claim 1 wherein the silicon wafer is etched to form inwardly facing flexible arms having an opening surrounding each arm on 3 sides.

3. The scanning mirror of claim 1 wherein the first piezoelectric element bends in a first direction when a first electrical signal is applied thereto and in a second direction when a second electrical signal is applied thereto; and the second piezoelectric element bends in the second direction when the first electrical signal is applied thereto and in the first direction when the second electrical signal is applied thereto.

4. The scanning mirror of claim 3 wherein the first electrical signal is applied to the first piezoelectric element alternately with the second electrical signal and the second electrical signal is applied to the second piezoelectric element alternately with the first electrical signal.

5. A method of scanning an image utilizing a scanning mirror comprising first and second piezoelectric element coupled to the mirror by flexible arms, the method comprising:

directing a light beam modulated by image data onto the mirror;

actuating the first piezoelectric element to bend alternately in a first direction and then a second direction, the second direction being opposite the first direction; and actuating the second piezoelectric element to bend alternately in a second direction and then a first direction, whereby the mirror is caused to scan one axis of the image.

6. The method of claim 5 wherein the light beam is reflected off a second scanning mirror which scans the image along a second axis thereof.

7. The method of claim 5 wherein the mirror scans the image at a frequency of 60 Hz.

* * * * *